United States Patent
Sandberg et al.

(10) Patent No.: US 8,695,532 B2
(45) Date of Patent: Apr. 15, 2014

(54) MILKING SYSTEM AND METHOD FOR VACUUM REGULATION

(75) Inventors: Ola Sandberg, Gnesta (SE); Eva Pia Sandstedt, legal representative, Gnesta (SE); Helmut Obermüller, Stockholm (SE)

(73) Assignee: DeLaval Holding AB, Tumba (SE)

( * ) Notice: Subject to any disclaimer, the term of this patent is extended or adjusted under 35 U.S.C. 154(b) by 749 days.

(21) Appl. No.: 12/280,082

(22) PCT Filed: Jan. 25, 2007

(86) PCT No.: PCT/SE2007/000069
§ 371 (c)(1),
(2), (4) Date: May 24, 2010

(87) PCT Pub. No.: WO2007/089185
PCT Pub. Date: Aug. 9, 2007

(65) Prior Publication Data
US 2010/0236484 A1    Sep. 23, 2010

(30) Foreign Application Priority Data
Jan. 31, 2006  (SE) ........................... 0600199

(51) Int. Cl.
*A01J 5/00*  (2006.01)

(52) U.S. Cl.
USPC ........................................ 119/14.02

(58) Field of Classification Search
CPC .................................. A01J 5/01; A01J 5/0075
USPC ............. 119/14.02, 12.28, 14.51, 14.08, 14.2
See application file for complete search history.

(56) References Cited

U.S. PATENT DOCUMENTS

| 4,011,838 | A | * | 3/1977 | Nordegren et al. | 119/14.08 |
| 4,292,926 | A | * | 10/1981 | Tilman | 119/14.02 |
| 4,499,854 | A | * | 2/1985 | Hoefelmayr et al. | 119/14.32 |
| 4,605,040 | A | * | 8/1986 | Meermoller | 137/489 |
| 5,052,341 | A | * | 10/1991 | Woolford et al. | 119/14.2 |

(Continued)

FOREIGN PATENT DOCUMENTS

| EP | 1 302 101 A2 | 4/2003 |
| EP | 1 312 256 A2 | 5/2003 |
| JP | 59-45519 | 3/1984 |
| SU | 1061771 A | 12/1983 |

OTHER PUBLICATIONS

International Search Report dated Apr. 27, 2007, in PCT application.

*Primary Examiner* — Kimberly Berona
*Assistant Examiner* — Joshua Huson
(74) *Attorney, Agent, or Firm* — Young & Thompson

(57) ABSTRACT

A milking system includes a vacuum pump (11); milking equipment (15); a conduit (14) connecting the milking equipment to the vacuum pump; and a first vacuum regulator (25) provided to maintain a preset vacuum level in the milking equipment. A second vacuum regulator (27, 29, 30a) is arranged between the first vacuum regulator and the vacuum pump and is provided for regulating the preset vacuum to a desired level. Preferably, the second vacuum regulator includes a pressure sensor (30a) provided for measuring a pressure level in the milking system; adjustable air admitting elements (31), e.g. a solenoid valve, provided for admitting air to enter the conduit; and a control device (29) provided for controlling the second vacuum regulator depending on the measured pressure level.

26 Claims, 2 Drawing Sheets

(56) References Cited

U.S. PATENT DOCUMENTS

| | | | |
|---|---|---|---|
| 5,284,180 A | | 2/1994 | Guo et al. |
| 5,960,736 A | * | 10/1999 | Ludington et al. ......... 119/14.08 |
| 5,967,172 A | | 10/1999 | Cook |
| 6,009,832 A | * | 1/2000 | Innings et al. ............. 119/14.02 |
| 6,164,242 A | * | 12/2000 | Olofsson ................... 119/14.02 |
| 6,494,163 B1 | | 12/2002 | Oort |
| 6,722,208 B2 | * | 4/2004 | Brown et al. .............. 73/861.15 |
| 6,755,152 B1 | * | 6/2004 | Cooper ...................... 119/14.02 |
| 6,796,271 B2 | * | 9/2004 | van den Berg ............. 119/14.43 |
| 7,450,021 B1 | * | 11/2008 | Gehm et al. .................. 340/626 |
| 2002/0156589 A1 | * | 10/2002 | Fematt ............................ 702/45 |
| 2005/0274326 A1 | * | 12/2005 | Stellnert et al. ............ 119/14.08 |

* cited by examiner

MILKING SYSTEM AND METHOD FOR VACUUM REGULATION

TECHNICAL FIELD OF THE INVENTION

The present invention generally relates to the field of vacuum regulation in connection with machine milking. Specifically, the invention relates to a milking system comprising a vacuum regulator and to a method for vacuum regulation.

DESCRIPTION OF RELATED ART AND BACKGROUND OF THE INVENTION

Large efforts have been invested in changing the ways that vacuum is controlled in milking machines. This far, however, these efforts have not resulted in a commensurate improvement in milking performance.

One problem when controlling the vacuum in a milking machine is that the vacuum level at the teat end differs from the system vacuum (i.e. pump vacuum or a controlled constant vacuum below pump vacuum), and that the difference varies with time during milking, which result in difficulties to predict how the teat and vacuum is affected by a change in system vacuum.

The difference between system vacuum and the vacuum level at the teat end is mainly the result of a vacuum drop in the long milk tube and the associated vacuum fluctuations caused by slugs of milk in the tube and intermittent air admission to the milking unit, a vacuum drop and vacuum fluctuations produced in the short milk tube due to milk slugs, vacuum fluctuations at the teat end caused by the opening and closing of the liner, and slugging in the milk line.

In order to control the teat end vacuum several designs have been implemented that includes separating milk and air flow near the milking animal, reducing the amount of undesired air admission to the vacuum system, increasing the diameter of the short milk tube, the long milk tube, and the milk line, and reducing teat end vacuum during periods of low milk flow.

There are two fundamental methods of influencing the vacuum in the milking machine: 1) using a vacuum pump running at constant speed, and a device to regulate the vacuum based on adjustment, of the amount of air being admitted to the milking machine, and 2) using a control device to regulate the vacuum based on adjustment of the amount of air being removed from the milking machine, i.e. using a variable frequency drive (VFD) controller for adjusting the vacuum pump speed.

Common vacuum regulation devices based on the first method include those relying on a force balance between the partial vacuum produced inside the milking machine and the resisting force of a weight, spring, or similar. More sophisticated regulators use a feedback system consisting of a sensing element and a mechanical amplification system. A small control valve regulates the movement of a much larger air inlet valve.

U.S. Pat. No. 6,164,242 discloses a milking apparatus which includes a vacuum pump, a milking device having at least one milking claw and teat cups provided to be attached to an animal to be milked, and a conduit connecting the milking claw and teat cups to a suction side of the vacuum pump and being adapted to transport a flow from the milking device. The vacuum pump is of a dynamic type. Furthermore, a regulating device is adapted to maintain the vacuum level of the milking apparatus at a desired, constant value. Furthermore, the regulating device comprises a sensor for sensing the actual vacuum level to the desired value by regulating the size of the air flow through the conduit and the vacuum pump in response to the vacuum level sensed.

U.S. Pat. No. 6,494,163 B1 discloses a vacuum control system comprising a vacuum pump which is interconnected to a buffer vessel via a vacuum line. Each teat cup of the milking apparatus has a milk line which interconnects the teat cup to the buffer vessel. A regulator which includes an rpm governor and an electronic filter unit is connected to the vacuum pump and also by the filter unit to a vacuum sensor which, in turn is connected to the vacuum line. The filter unit is connected both to the rpm governor and to an electronic fast-acting control valve which is activated by the regulator on the basis of signals which it receives from the vacuum sensor. If the vacuum decreases in the vacuum line (and thus the buffer vessel) as result of, for example, a teat cup being disconnected from the teat of an animal being milked, the rpm governor causes the vacuum pump to increase its rpm and therefore capacity whereby the vacuum is maintained at a constant value. On the other hand, if the vacuum in the vacuum line increases over its desired level, the electronic fast-acting valve is actuated to admit air to the vacuum line and thereby maintain the vacuum therein at a constant desired level.

SUMMARY OF THE INVENTION

A shortcoming of the above vacuum control arrangements is that they may not be optimized for achieving a sufficiently constant and well-defined vacuum in the teat cup. Further, they seem not to provide for separate control of the pulsating vacuum level.

Another shortcoming is that the above systems do not provide for continuous changing of the desired level of the vacuum during milking and during other operations related to the milking such as cleaning, teat cup cleaning and cleaning.

It is an object of the present invention to provide an improved milking system and a method for vacuum regulation, which alleviate at least some of the shortcomings mentioned above with regard to the prior art systems.

It is yet a further object of the invention to provide such a milking system and such a method which are efficient, accurate, precise, flexible, fast, simple, reliable, of low cost, and easy to use.

These objects among others are, according to the present invention, attained by milking systems and methods for vacuum regulation as claimed in the appended patent claims.

According to a first aspect of the invention there is provided a milking system comprising a vacuum pump, milking equipment, a conduit connecting the milking equipment to the vacuum pump, a first vacuum regulator provided to maintain a preset vacuum level in the milking equipment, and a second vacuum regulator arranged between the first vacuum regulator and the vacuum pump and provided for regulating the preset vacuum to a desired level. The second vacuum regulator comprising preferably a pressure sensor provided for measuring a pressure level in the milking system, a valve arrangement provided for admitting air to enter the conduit, and a control device provided for controlling the valve arrangement depending on the measured pressure level.

According to a second aspect of the invention there is provided a method for vacuum regulation in a milking system comprising a vacuum pump, milking equipment, and a conduit connecting the milking equipment to the vacuum pump, the method comprising the steps of maintaining a present vacuum level in the milking equipment by means of a first vacuum regulator and regulating the preset vacuum to a desired level by means of a second vacuum regulator located between the first vacuum regulator and the vacuum pump.

By means of the invention an improve technique for vacuum regulation is obtained, by which not only a more stable preset vacuum at the tip of the teats of the milking animal can be achieved, but also capabilities of changing the preset vacuum to any desired level between the system vacuum (as set by the vacuum pump) and almost atmospheric pressure. The invention may be utilized in a number of different applications including those that apply different milking schemes using different vacuum levels during different phases of milking.

According to a third aspect of the invention there is provided a vacuum regulator for a milking system comprising a vacuum pump, milking equipment, and a conduit connecting the milking equipment to the vacuum pump, wherein the vacuum regulator comprises a pressure sensor provided for measuring a pressure level in the milking system, a solenoid valve provided for admitting air to enter the conduit, the solenoid valve comprising a solenoid and a valve disc, and a control device provided for controlling the solenoid valve depending on the measured pressure level by means of supplying current, preferably a PWM current, to the solenoid to thereby control the force of the solenoid on the valve disc to allow a thin layer of air to flow through the solenoid valve and into the conduit.

The above vacuum regulator is a simple, but yet flexible, device that may improve vacuum control in a variety of milking systems.

According to a fourth aspect of the invention there is provided a method for vacuum regulation in the above milking system comprising the steps of measuring a pressure level in the milking system, admitting air to enter the conduit by means of a solenoid valve comprising a solenoid and a valve disc, and controlling the solenoid valve depending on the measured pressure level by means of supplying a current, preferably a PWM current, to the solenoid to thereby control the force of the solenoid on the valve disc to allow a thin layer of air to flow through the solenoid valve and into the conduit.

Further characteristics of the invention and advantages thereof, will be evident from the following detailed description of embodiments of the present invention given hereinafter and the accompanying FIGS. 1-4, which are given by way of illustration only, and shall thus not limit the scope of the present invention.

DETAILED DESCRIPTION OF EMBODIMENTS

Figure 1:
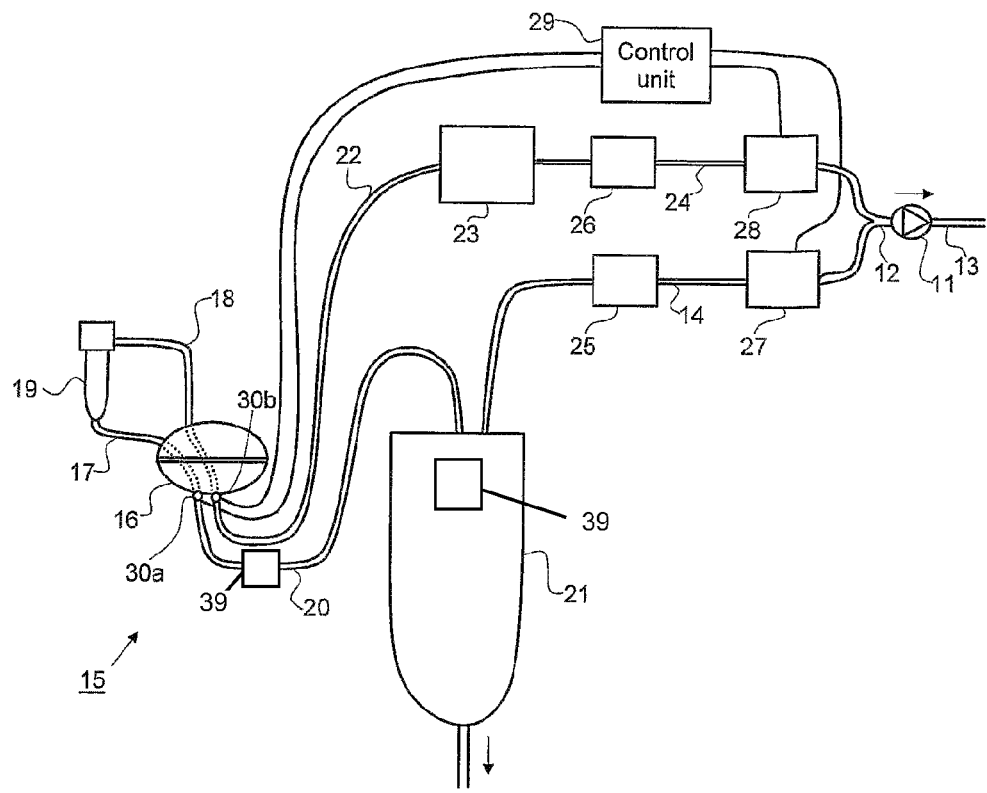
FIG. 1 is a schematic view of parts of a milking system according to an embodiment of the invention.

A milking system according to an embodiment of the invention is partly disclosed in FIG. 1. A vacuum pump 11 has a suction side 12 and a pressure side 13, wherein the suction side 12 of the vacuum pump 11 is via a vacuum conduit 14 connected to a milking device 15. The milking device 15 comprises a milking claw 16 which, via a milk tube 17 and a pulse tube 18, is connected to a teat cup 19 provided to be attached to a teat of an animal, such as a cow, to be milked. Of course, the milking device 15 may comprise more than one milking claw and each milking claw may be connected to more than one teat cup. In case the animals are cows four teat cups are needed for the milking of each animal.

From the milking claw 16 the milk is transported by a further milk tube 20 to a receiving vessel 21. The receiving vessel 21, which is connected to the vacuum conduit 14, may be provided with a separator for intermittently removing separated liquid and for preventing that liquid is introduced in the vacuum conduit 14.

Furthermore, the milking claw 16 is, via a pulse tube 22, connected to a pulsator 23. The pulsator 23 may be connected, as illustrated, to the vacuum pump 11 via a further vacuum conduit in order to be capable of controlling the pulsation and milking vacuum levels independently of each other. Alternatively, the pulsator 23 is connected to the vacuum conduit 14 and uses the same vacuum regulation as is used for the milk tube 17.

The vacuum pump 11 sucks a flow of air from the milking device 15 via the vacuum conduits 14 and 24. Via the further vacuum conduit 24 and the pulsator 23 a pulsating sub-pressure is produced in a known manner in a pulsating chamber (not shown) of the teat cup 19. This pulsating sub-pressure varies during a pulsation cycle, for instance between atmospheric pressure and a pulsating vacuum level. Via the vacuum conduit 14, a sub-pressure is produced in the receiving vessel 21, in the milk tube 20, and in an inner, teat-receiving space (not shown) of the teat cup 19. By means of this milking vacuum, milk is sucked from the teats to the receiving vessel 21.

In order to regulate the milking vacuum such that a constant preset level is maintained, and to regulate the pulsating vacuum such that the maximum pulsating vacuum in each pulsation cycle amounts to a preset level a first respective vacuum regulator 25, 26 is provided in the respective vacuum conduit 14, 24.

Each of the regulators 25, 26 may be any regulator known in the art, but is preferably a cost-efficient and reliable mechanic vacuum regulator. For instance, the vacuum regulators 25, 26 may each be comprised of a vacuum regulator of membrane type as being disclosed in detail in WO 02/19804 or in EP0017493, the contents of which being hereby incorporated by reference.

Further, according to the present invention, a respective valve arrangement 27, 28 is provided in the respective vacuum conduit 14, 24 between the first respective vacuum regulator 25, 26 and the vacuum pump 11. Each of the valve arrangements 27, 28 is connected to a control unit 29 via a respective separate control signal connection. Further, pressure sensors 30a, 30b located in the milking equipment 15, are each connected to the control unit 29 via a respective signal connection, and are each provided for repeatedly measuring a respective pressure level in the milking device 15 and for forwarding the respective repeatedly measured pressure level to the control unit 29. Preferably, the pressure sensors 30a, 30b are located as close as possible to the animal that is milked to measure the milking and pulsation vacuum levels that are experienced by the animal. Thus, the pressure sensor 30a is conveniently located in the teat cup 11, in the milking claw 16, or in the milk tube 20, whereas the pressure sensor 30b is conveniently located in the teat cup 11, in the milking claw 16, or in the pulse tube 22.

A respective second vacuum regulator is formed by the respective valve arrangement 27, 28, the control unit 29 and the respective pressure sensor 30a, 30b connected together and is provided for regulating the preset vacuum in the respective vacuum conduit 14, 24 to a respective desired level. To this end the control unit 29 is preferably provided for controlling the valve arrangements 27, 28 depending on the repeatedly measured pressure levels as sensed by the pressure sensors 30a, 30b.

By providing different valve arrangements 27, 28 and different vacuum conduits 14, 24 for the milking vacuum and the pulsation vacuum the milking vacuum can be controlled to a first desired level, and the pulsation vacuum can be controlled to a second desired level, which is different from that of the first desired level. If the milking vacuum and the maximum vacuum of the pulsation vacuum are to be the same, the vacuum conduit 24, the first vacuum regulator 26, and the valve arrangement 28 may be exchanged for a conduit connecting the pulsator 23 to the vacuum conduit 14 between the vacuum regulator 25 and the valve arrangement 27.

It shall be appreciated that the vacuum regulators of the invention may be used for the control of the milking vacuum in more teat cups than one, e.g. in four teat cups.

Alternatively, each of a plurality of teat cups is connected individually to a vacuum source via a respective milk tube, a respective receiving vessel, a respective vacuum conduit, optionally a respective first vacuum regulator, and a respective valve arrangement of the kind disclosed as parts 27 and 28. Each of the valve arrangements is controlled by the control unit 29 so that a desired individual vacuum level can be achieved in each of the teat cups. By such arrangement, the vacuum levels can be set to different values in different teat cups. Such solution may be preferred in case a cow has mastitis in one of the udder quarters, and the vacuum level in the teat cup used for milking that udder quarter should be set to a lower vacuum level in order to treat that teat more gently.

Figure 2:
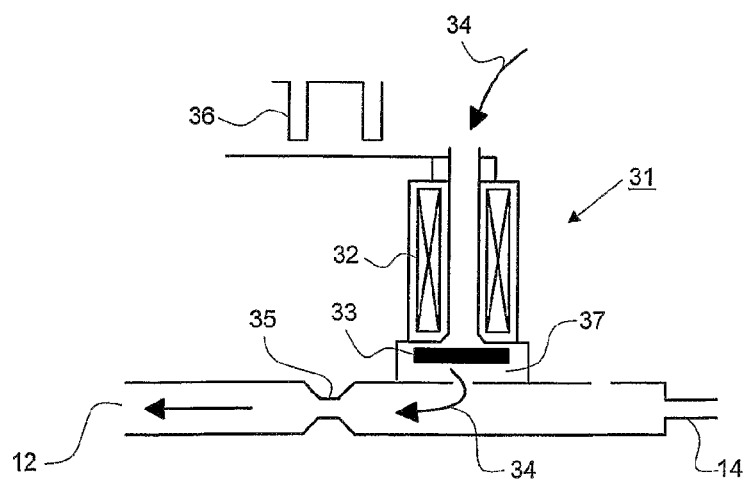
FIG. 2 is a schematic view of a solenoid valve and parts of a vacuum conduit as being comprised in the milking system of FIG. 1.

In FIG. 2 the valve arrangement 27 is shown in more detail. A left-hand end of the conduit 14 is connected to the suction side 12 of the vacuum pump 11. The valve arrangement 27 comprises a solenoid valve 31 including a solenoid 32 and a valve disc 33, wherein the solenoid valve 31 is connected to the vacuum conduit 14 and is provided to admit air to enter the vacuum conduit 14 through the solenoid valve 31 to reach the desired level of the preset vacuum. The air flow is indicated by arrows 34 in FIG. 2. The valve arrangement 27 comprises an air flow restriction 35 arranged upstream of the solenoid valve 31.

The control unit 29 is provided for supplying a current, preferably a PWM current 36, to the solenoid 32 to thereby control the force of the solenoid 32 on the valve disc 33. At 100% duty cycle the solenoid valve 31 is completely closed and the controlled vacuum level will be the same as the system vacuum level provided by the vacuum pump 11. At 0% duty cycle the solenoid valve 31 is completely open and the controlled vacuum level will be close to atmospheric pressure depending on the relationship between the size of the restriction 35 and the valve capacity. To achieve a stable vacuum level somewhere between system vacuum and atmosphere, the air inlet through the solenoid valve 31 should be balanced against the air outlet through the restriction 35. To this end the solenoid valve 31 is controlled so that the valve disc 33 will, during use, continuously "float" on a thin layer 37 of air flowing into the vacuum conduit 14. The lower the desired preset vacuum is, the thicker the thin air layer 37 will be.

The frequency of the PWM current has to be high enough so that the valve disc 33 is not affected by the switching of the PMW current. An appropriate frequency may be in the range of 1-10 kHz.

The valve arrangement 28 in the vacuum conduit 24 for the pulsating vacuum has advantageously a similar structure and a similar function as the valve arrangement 27.

It shall be noted that positions of the solenoid valve 31 and the air flow restriction 35 may be exchanged without affecting the operation of the valve arrangement. In such version the solenoid valve 31 is arranged to control the flow of air through the vacuum conduit 14 towards the suction side 12 of the vacuum pump 11, and the air flow restriction 35 is located downstream of the solenoid valve 31 and is arranged to admit ambient air to enter the vacuum conduit 14.

It shall be understood that the above described solenoid valve 31 may be exchanged for another valve arrangement or other adjustable air admitting means known in the art or conceivable by a person skilled in the art.

In one embodiment the milking equipment comprises a milk meter 39 provided for measuring a milk flow during milking by the milking device 15. The milk meter 39 is preferably located in the milk tube 20 or in the receiving vessel 21. Measured milk flow values may be supplied to the control unit 29, which may control the solenoid valve 31 depending thereon. Reference is here made to U.S. Pat. No. 4,499,854, the contents of which being hereby incorporated by reference.

Still further, the inventive vacuum regulator may be provided in a high-line milking plant in order to achieve a stable vacuum in the milking claw and in the teat cups despite the vacuum drop due to milk transportation and large range of lifts. By increasing the system vacuum as compared to ordinary milking systems and by using the inventive vacuum regulator provided with pressure measurement capabilities close to the milking claw and the teat cups, the vacuum level in the teat cups can be kept at a desired level also at higher milk flows (up to a given maximum milk flow). Tests have shown that if the system vacuum is increased to about 55 kPa a fairly constant vacuum level of about 35 kPa at the tip of the teats is achievable up to milk flows of about 5.5 l/min.

In another embodiment the control unit 29 is provided for controlling the solenoid valve 31 in response to predictable vacuum variations, e.g. regularly recurring vacuum variations, in the milking device 15. Such predictable vacuum variations may comprise those occurring due to the regularly varying pulsation vacuum in the milking device 15. In fact, a large part of the vacuum fluctuations is related to the pulsation, and such part is relatively easy to predict.

Generally, the control unit 29 may be provided for controlling the valve arrangements 27, 28 depending on the repeatedly measured pressure levels as sensed by the pressure sensors 30a, 30b in order to obtain a second outer regulation of the preset vacuum (in addition to the first inner vacuum regulation provided by the first vacuum regulators 25, 26). Since each of the vacuum regulators 25, 26 acts to reduce the pressure gradient between an upstream side and a downstream side of the vacuum regulator, it is not generally capable of knowing the vacuum level at the tip of the teats of the animal that is being milked. The inventive vacuum regulator may thus assist in obtaining a constant vacuum level closer to the animal being milked by adjusting, i.e. increasing, the vacuum level before the vacuum regulators 25, 26 will notice a vacuum change, i.e. vacuum drop.

The vacuum regulator of the present invention is useful in a number of different applications.

For instance, the inventive vacuum regulator may be provided for regulating the preset vacuum to different desired levels during different phases of the milking of an animal by the milking system. Such milking systems are disclosed in e.g. U.S. Pat. No. 4,011,838 and EP 0403549 A1, the contents of which being hereby incorporated by reference.

Further, the inventive vacuum regulator may be provided for varying, i.e. increasing or decreasing, the preset vacuum in order to obtain different milking schemes, each of which being distinguished by a set of milking parameters, such as milking vacuum, high pulse vacuum, low pulse vacuum, pulse rate, and pulse length, and each of which being tested during a test period, after which the milking schemes are evaluated, and one is selected and used during a following milking period as being described in our Swedish patent application No. 0403089-6, entitled Method, computer program product and arrangement for controlling the milking by a milking machine, and filed with the Swedish Patent Office on Dec. 20, 2004. The contents of this application are hereby incorporated by reference.

Still further, the inventive vacuum regulator may be provided for varying, i.e. increasing or decreasing, the preset vacuum monotonously during a phase of the milking of a cow by the milking system. In case the preset vacuum is monotonously increased, it may be increased until a given vacuum level is reached or until a milk flow as measured during the milking of a cow by the milking system has reached a given value.

Yet further, the inventive vacuum regulator may be provided for varying the preset milking vacuum through the vacuum levels of a given range, while a cow is milked by the aid of the milking vacuum, while monitoring a milk flow from the cow during the variation of the vacuum levels, and setting the milking vacuum to the lowest vacuum level of the given range, for which the milk flow from the milking animal is at least a given fraction of the highest milk flow monitored while the milking vacuum is varied; and keeping the milking vacuum at the set vacuum level during a following part of the milking of the milking animal as being described in our Swedish patent application No. 0403088-8, entitled Method, computer program product and arrangement for controlling the milking by a milking machine, and filed with the Swedish Patent Office on Dec. 20, 2004. The contents of this application are hereby incorporated by reference.

Figure 3:
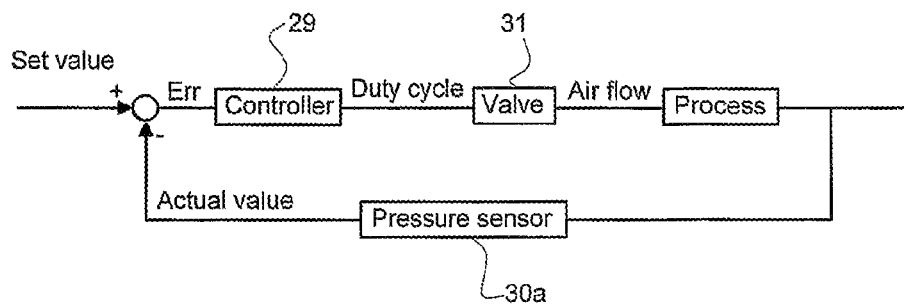
FIG. 3 illustrates a control method as being implementable in the milking system of FIG. 1.

With reference next to FIG. 3, a control method as implemented in the control unit 29 will be overviewed. The valve disc 33 is stable through most of its operating range. A certain duty cycle corresponds thus to a given pressure gradient over the valve disc 33. The force caused by the pressure difference over the valve disc 33 is balanced by the magnetic force from the solenoid 32.

The control unit 29 for controlling the vacuum level may be an integral controller having an output (duty cycle) $O_I$ according to:

$$O = O_I = -k_I \Sigma \text{Err} dt$$

where $k_I$ is the integrating gain, Err is the difference of the set value (as set by the control unit 29) and the actual value (as measured by the pressure sensor 30a), and dt is the time sample.

Figure 4:
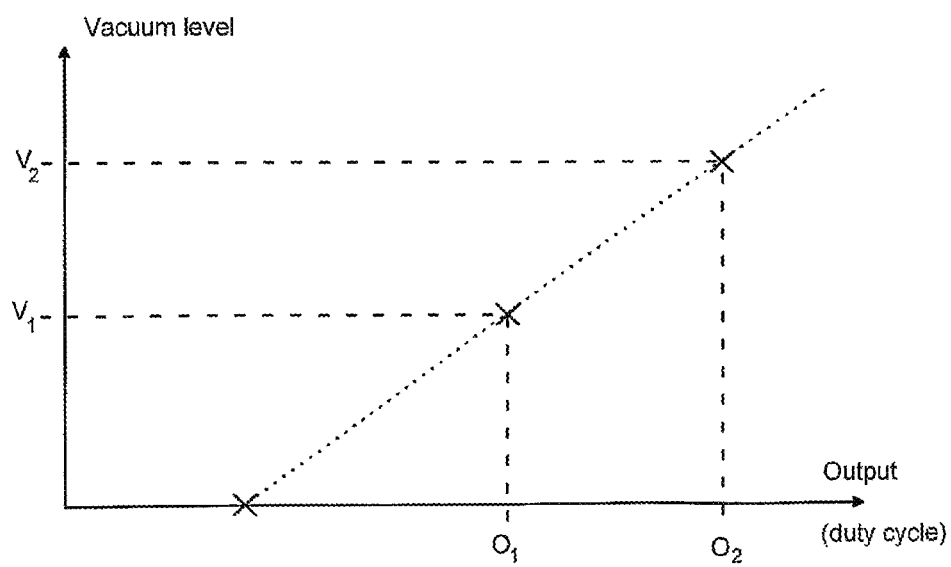
FIG. 4 is a diagram of a vacuum level in the milking system of FIG. 1 versus output of a controller device as being comprised in the milking system of FIG. 1.

Such a control method will have good accuracy, but the response time will be slow. A high gain may cause self-oscillation which of course is undesirable. The response time may be improved by adding a proportional factor of $$O_P = O_I + k_P \text{Err}$$

to the output. To be capable of using proportional control the relation between vacuum levels and output levels has to be determined. Such determination can be performed automatically at start-up. One such determination method, which is simple and fast, comprises the selection of two different vacuum levels $V_1$, $V_2$ and the determination, by means of the integration control, to which output levels $O_1$, $O_2$ these vacuum levels correspond. Preferably, the two different vacuum levels are located close to the desired level since the characteristic is nonlinear. In FIG. 4 a diagram of vacuum levels versus output levels is shown, wherein the two vacuum levels $V_1$, $V_2$ and the corresponding output levels $O_1$, $O_2$ are indicated.

The proportional factor will then be:

$$O_p = O_C + k_P \text{Err}$$

where $O_C$ is the calculated output based on linear interpolation and/or extrapolation in the diagram shown in FIG. 4.

The control may be further improved by adding a derivative part to achieve a full PID (Proportional-Integral-Derivative) controller.

While the present invention has been described in various embodiments it shall be appreciated that it is not limited to such features and details, but is defined by the appended patent claims.

The invention claimed is:

1. A milking system for milking an animal, comprising:
   a vacuum pump (11);
   milking equipment (15) comprising a milk tube (20) discharging into a receiving vessel (21);
   a conduit (14) connecting said receiving vessel (21) of said milking equipment to said vacuum pump;
   a first vacuum regulator (25) provided in the conduit (14) between the vacuum pump and the receiving vessel to substantially maintain a preset vacuum level in said milking equipment;
   a second vacuum regulator (27, 29, 30a) provided in the conduit (14), arranged between said first vacuum regulator and said vacuum pump, and provided for regulating said preset vacuum level in the milking equipment to a desired level by adjusting a vacuum level in the conduit; and
   a milk meter (39) arranged for measuring a current milk flow value of milk flow from the animal during milking by said milking equipment,
   wherein said second vacuum regulator comprises
   i) an adjustable air admitting part (31) provided for admitting air to enter said conduit (14), and
   ii) a control unit (29) provided for controlling said adjustable air admitting part (31) depending on the current measured milk flow value during milking the animal to thereby control the milking vacuum level during the milking, and
   wherein the milk meter is arranged to provide the current measured milk flow value to the control unit (29), and
   wherein the second vacuum regulator adjusts the vacuum level in the conduit based on the current measured milk flow value by increasing the vacuum level in the conduit to a level sufficient to compensate for vacuum loss at the milking equipment and to prevent teat cups at the milking equipment from dropping off of teats of the animal when the current measured milk flow value is increased from a previously-measured milk flow value.

2. The milking system of claim 1, further comprising a pressure sensor (30a) provided in the milking equipment, the pressure sensor (30a) arranged to measure a milking vacuum level experienced by the animal during the milking, wherein said pressure sensor (30a) is provided in one of a teat cup (11), a milking claw (16), and the milk tube (20), and the milk meter (39) is provided in one of the milk tube (20) and the receiving vessel (21), the a control unit (29) i) receiving a milking vacuum level signal from the pressure sensor (30a)

during the milking, and ii) provided for controlling said adjustable air admitting part (31) depending on the measured milk flow value and the received milking vacuum level signal to thereby control the milking vacuum level during the milking.

3. The milking system of claim 2, wherein said adjustable air admitting part is provided for admitting air to enter said conduit and said control device for controlling said adjustable air admitting art by proportional control, wherein said control device, at start-up of said milking system, is provided for selecting at least two different vacuum levels and for determining, by means of feedback control, which control signals at least two different vacuum levels correspond to, said feedback control comprising said pressure sensor (30*a*) being arranged in a feedback loop around said control unit (20) and said adjustable air admitting part (31).

4. The milking system of claim 3, wherein said two different vacuum levels are located close to said desired level.

5. The milking system of claim 2, wherein said milk meter (39) is provided in the milk tube (20).

6. The milking system of claim 2, wherein said milk meter (39) is provided in the receiving vessel (21).

7. The milking system of claim 2, wherein said pressure sensor (30*a*) is i) provided in the teat cup (11), and ii) is included in a feedback loop around said control unit (20) and said adjustable air admitting part (31).

8. The milking system of claim 2, wherein said pressure sensor (30*a*) is provided in the milk tube (20), and ii) is included in a feedback loop around said control unit (20) and said adjustable air admitting part (31).

9. The milking system of claim 1, wherein said adjustable air admitting part (31) comprises a solenoid valve (31) including a solenoid (32) and a valve disc (33), said solenoid valve being connected to said conduit (14) and provided to admit air to enter said conduit (14) through said solenoid valve (31) to reach said desired level of said preset vacuum.

10. The milking system of claim 9, wherein said control unit (29) is provided for supplying a current, to the solenoid to thereby control a force of said solenoid on said valve disc.

11. The milking system of claim 9, wherein the valve disc of said second vacuum regulator is provided, during use, for continuously floating on a thin layer (37) of air flowing into the conduit.

12. The milking system of claim 1, wherein said control unit (29) is arranged for controlling said adjustable air admitting part in response to predictable vacuum variations in said milking equipment, together with the measured milk flow values and the received milking vacuum level signal.

13. The milking system of claim 12, wherein said predictable vacuum variations comprise vacuum variations occurring due to the pulsation vacuum in said milking equipment.

14. The milking system of claim 1, wherein said second vacuum regulator is provided for regulating said preset vacuum to different desired levels during different phases of the milking of the animal by said milking system.

15. The milking system of claim 1, wherein said second vacuum regulator is provided for increasing said preset vacuum monotonously during a phase of the milking of the animal by said milking system.

16. The milking system of claim 1, wherein said second vacuum regulator is provided for increasing said preset vacuum monotonously until a milk flow as measured by the milk meter during the milking of an animal by said milking system has reached a given value.

17. The milking system of claim 1, wherein said first vacuum regulator is a mechanic vacuum regulator acting to reduce the pressure gradient between an upstream side and a downstream side of said mechanic vacuum regulator.

18. The milking system of claim 1, wherein said second vacuum regulator is provided for regulating a milking vacuum of said milking system to a first desired level;

and said milking system comprises a third vacuum regulator (28, 29, 30*b*) provided for regulating a pulsation vacuum level of said milking system to a second desired level, so that the milking vacuum level is controlled independent of the pulsation vacuum level.

19. The milking system of claim 1, comprising (a) three further milking equipments, where each of the milking equipments comprises a teat cup and a milk tube; (b) three further conduits, where each of the conduits connects a respective one of the milking equipments to said vacuum pump; and (c) three further second vacuum regulators, where each of the second vacuum regulators is provided for regulating the vacuum in a respective one of the milking equipments to a desired individual vacuum level.

20. The milking system of claim 19, wherein the second vacuum regulators are provided for regulating the vacuum in the milking equipments to different vacuum levels.

21. A method for vacuum regulation in a milking system, which comprises a vacuum pump (ii); milking equipment (15) comprising a milk tube discharging into a receiving vessel; a milk meter in said milking equipment for measuring a milk flow from the animal during the milking; and a conduit (14) connecting said receiving vessel to said vacuum pump, said method being characterized by the steps of:

substantially maintaining a preset vacuum level in said milking equipment by means of a first vacuum regulator (25) provided in the conduit between the vacuum pump and said receiving vessel; and regulating said preset vacuum level to a desired milking vacuum level by means of a second vacuum regulator (27, 29, 30*a*) located between said first vacuum regulator and said vacuum pump by adjusting a vacuum level in the conduit based on said measured milk flow during the milking by increasing the vacuum level in the conduit to a level sufficient to compensate for vacuum loss at the milking equipment and to prevent teat cups at the milking equipment from dropping off of teats of the animal when a current measured milk flow value is increased from a previously-measured milk flow value.

22. The method of claim 21 comprising the steps of:

measuring the milking vacuum levels by measuring a pressure level in said milking equipment in one of a teat cup, a milk tube, and a milking claw of said milking equipment;

admitting air to enter said conduit by means of said second vacuum regulator; and controlling said second vacuum regulator depending on said measured pressure level, and regulating a pulsation vacuum level within the milking equipment independently of said milking vacuum level.

23. The method of claim 22 wherein said second vacuum regulator comprises a solenoid valve (31) including a solenoid (32) and a valve disc (33); and said air is admitted to enter said conduit by means of supplying a current to the solenoid to thereby control the force of said solenoid on said valve disc so that the valve disc is, during use, continuously floating on a thin layer (37) of air flowing into the conduit.

24. The method of claim 21, wherein said second vacuum regulator is controlled in response to predictable vacuum variations in said milking equipment.

25. A vacuum regulator for a milking system, which comprises a vacuum pump (11); milking equipment (15) comprising a milk tube (20) discharging into a receiving vessel (21); a conduit (14) connecting said receiving vessel (21) of said milking equipment to said vacuum pump; and a vacuum regulator in the conduit disposed between the vacuum pump and the receiving vessel and configured to maintain a present milking vacuum level, said vacuum regulator comprising:
- a pressure sensor (30a) provided for measuring a pressure level in said milking system at one of one of a teat cup (11), a milking claw (16), and the milk tube (20);
- a solenoid valve (31) provided for admitting air to enter said conduit, said solenoid valve comprising a solenoid (32) and a valve disc (33);
- a milk meter provided for measuring a milk flow during milking by said milking equipment; and
- a control device (29) provided for controlling said solenoid valve depending on said measured pressure level within said milking equipment, as measured by said pressure sensor (30a) and the measured milk flow, by means of supplying a current to the solenoid to thereby control the force of said solenoid on said valve disc to allow a thin layer (37) of air to flow through the solenoid valve and into the conduit at a position in the conduit between the vacuum pump and the vacuum regulator in order to regulate the preset milking vacuum level to a desired level based on the measured pressure level and the measured milk flow by adjusting a vacuum level in the conduit, the control device increasing the vacuum level in the conduit to a level sufficient to compensate for vacuum loss at the milking equipment and to prevent teat cups at the milking equipment from dropping off of teats of the animal when the current measured milk flow value is increased from a previously-measured milk flow value.

26. A method for vacuum regulation in a milking system, which comprises a vacuum pump (11); milking equipment (15) comprising a milk tube (20) discharging into a receiving vessel (21); a conduit (14) connecting said receiving vessel (21) of said milking equipment to said vacuum pump; and a vacuum regulator in the conduit disposed between the vacuum pump and the receiving vessel and configured to maintain a preset milking vacuum level, said method comprising the steps of:
- measuring a pressure level in said milking system at a location measuring milking vacuum level as experienced by an animal during milking;
- measuring, with a milk meter, a milk flow during milking by said milking equipment;
- admitting air to enter said conduit at a position in the conduit between the vacuum pump and the vacuum regulator by means of a solenoid valve (31) comprising a solenoid (32) and a valve disc (33); and
- controlling said solenoid valve depending on said measured pressure level and said measured milk flow to regulate the preset milking vacuum level to a desired level by adjusting a vacuum level in the conduit, by means of supplying a current to the solenoid to thereby control the force of said solenoid on said valve disc to allow a thin layer (37) of air to flow through the solenoid valve and into the conduit, the solenoid valve being controlled to increase the vacuum level in the conduit to a level sufficient to compensate for vacuum loss at the milking equipment and to prevent teat cups at the milking equipment from dropping off of teats of the animal when the current measured milk flow value is increased from a previously-measured milk flow value.

\* \* \* \* \*

UNITED STATES PATENT AND TRADEMARK OFFICE
CERTIFICATE OF CORRECTION

PATENT NO.        : 8,695,532 B2                                           Page 1 of 1
APPLICATION NO. : 12/280082
DATED             : April 15, 2014
INVENTOR(S)       : Sandberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this
Twenty-ninth Day of September, 2015

Michelle K. Lee
*Director of the United States Patent and Trademark Office*